US012651778B2

(12) United States Patent (10) Patent No.: US 12,651,778 B2
Takahashi et al. (45) Date of Patent: Jun. 9, 2026

(54) SECONDARY BATTERY, ELECTRONIC DEVICE, AND POWER TOOL

(71) Applicant: MURATA MANUFACTURING CO., LTD., Kyoto (JP)

(72) Inventors: Masashi Takahashi, Kyoto (JP); Hirotaka Fukudome, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 942 days.

(21) Appl. No.: 17/858,507

(22) Filed: Jul. 6, 2022

(65) Prior Publication Data

US 2022/0344724 A1 Oct. 27, 2022

Related U.S. Application Data

(63) Continuation of application No. PCT/JP2021/000828, filed on Jan. 13, 2021.

(30) Foreign Application Priority Data

Jan. 31, 2020 (JP) ................................. 2020-015007

(51) Int. Cl.
H01M 10/0587 (2010.01)
H01M 10/04 (2006.01)
(Continued)

(52) U.S. Cl.
CPC ... H01M 10/0587 (2013.01); H01M 10/0431 (2013.01); H01M 50/538 (2021.01); H01M 10/052 (2013.01); H01M 2220/30 (2013.01)

(58) Field of Classification Search
CPC ......................................... H01M 50/531–541
See application file for complete search history.

(56) References Cited

U.S. PATENT DOCUMENTS

2002/0110729 A1 8/2002 Hozumi et al.
2002/0142211 A1* 10/2002 Nakanishi ........... H01M 50/536
429/94
2007/0196730 A1 8/2007 Kozuki

FOREIGN PATENT DOCUMENTS

JP 2004095487 A * 3/2004
WO 2001024206 A1 4/2001

OTHER PUBLICATIONS

International Search Report of corresponding PCT application PCT/JP2021/000828, dated Mar. 23, 2021.

* cited by examiner

*Primary Examiner* — Robert S Carrico
(74) *Attorney, Agent, or Firm* — K&L Gates LLP

(57) ABSTRACT

Provided is a secondary battery, in the secondary battery, the positive electrode has a covered portion covered with a positive electrode active material layer and a positive electrode active material non-covered portion on a strip-shaped positive electrode foil, the negative electrode has a covered portion covered with a negative electrode active material layer and a negative electrode active material non-covered portion on a strip-shaped negative electrode foil, the positive electrode active material non-covered portion are joined to the positive electrode current collector plate at one end portion of the electrode winding body, the negative electrode active material non-covered portion is joined to the negative electrode current collector plate at the other end portion of the electrode winding body, the electrode winding body has a flat surface formed by bending any one or both of the positive electrode active material non-covered portion and the negative electrode active material non-covered portion.

11 Claims, 15 Drawing Sheets

(51) Int. Cl.
   *H01M 10/052*   (2010.01)
   *H01M 50/538*   (2021.01)

SECONDARY BATTERY, ELECTRONIC DEVICE, AND POWER TOOL

CROSS REFERENCE TO RELATED APPLICATIONS

The present application is a continuation of PCT/JP2021/000828, filed Jan. 13, 2021, which claims priority to Japanese patent application no. JP 2020-015007, filed Jan. 31, 2020, the entire contents of which are being incorporated herein by reference.

BACKGROUND

The present application relates to a secondary battery, an electronic device, and a power tool.

Lithium ion batteries have been developed for applications requiring high output such as power tools and automobiles. A battery suitable for high output often has a structure in which a current collector plate is joined to a current collecting foil exposed on an end surface of a cylindrical wound electrode body in order to flow a large current. In such a battery, the end surface of the wound electrode body is covered with the current collector plate. Therefore, when the battery abnormally generates heat, a generated gas tends to be less likely to be discharged to the outside of the wound electrode body.

For example, a battery is described with a structure in which electric resistance of a welded portion is reduced while explosion is reduced when a current collector lead extending from a current collector of a positive electrode and a sealing body are welded, welding strength is increased, and gas discharging ability is excellent. Specifically, a structure in which a protrusion of the current collector lead is disposed at a position corresponding to a gas discharge hole of the sealing body is disclosed.

SUMMARY

The present application relates to a secondary battery, an electronic device, and a power tool.

The battery described as noted above in BACKGROUND section does not suggest any gas discharge in the wound electrode body including the current collector plates on both end surfaces. In addition, since a hole is provided in a lead portion, an area of a gas purging hole is determined depending on the width and length of the lead, and it is difficult to secure a proper gas purging hole.

Therefore, the present application relates to providing a battery for high rate discharge in which a gas generated inside an electrode winding body easily releases by having a proper gas purging structure according to an embodiment.

In order to solve the above-described problems, the present application provides a secondary battery in which an electrode winding body having a structure in which a strip-shaped positive electrode and a strip-shaped negative electrode are stacked with a separator interposed therebetween and wound, a positive electrode collector plate, and a negative electrode collector plate are housed in a battery can, the positive electrode having a covered portion covered with a positive electrode active material layer and a positive electrode active material non-covered portion on a strip-shaped positive electrode foil, the negative electrode having a covered portion covered with a negative electrode active material layer and a negative electrode active material non-covered portion on a strip-shaped negative electrode foil, the positive electrode active material non-covered portion being joined to the positive electrode current collector plate at one end portion of the electrode winding body, the negative electrode active material non-covered portion being joined to the negative electrode current collector plate at the other end portion of the electrode winding body, the electrode winding body having a flat surface formed by bending any one or both of the positive electrode active material non-covered portion and the negative electrode active material non-covered portion toward a central axis of the wound structure and overlapping the positive electrode active material non-covered portion and the negative electrode active material non-covered portion, and a groove formed in the flat surface, and $0 \leq S1/S2 \leq 0.49$ being satisfied, where S1 represents an area where the positive electrode current collector plate and the negative electrode current collector plate overlap each other when viewed from a direction of the central axis, and S2 represents a sectional area of the electrode winding body when cut in a direction perpendicular to the central axis according to an embodiment.

According to an embodiment of the present application, when an overlap between the positive electrode current collector plate and the negative electrode current collector plate is small when viewed from the direction of the central axis of the electrode winding body, a lithium ion battery has improved gas release properties at the time of abnormal heat generation, and is a battery excellent in safety. The contents of the present application should not be interpreted as being limited by the effects exemplified herein.

BRIEF DESCRIPTION OF THE FIGURES

FIG. 20 is a connection diagram used for describing a battery pack as an application example according to an embodiment.

DETAILED DESCRIPTION

Hereinafter, various embodiments of the present application will be described with reference to the drawings.

The present application is described hereinafter in reference to specific examples, without limitation.

In an embodiment, a cylindrical lithium ion battery will be described as an example of the secondary battery.

Figure 1:
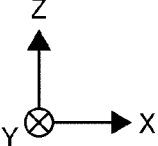
FIG. 1 is a schematic sectional view of a battery according to an embodiment.

First, a whole configuration of the lithium ion battery will be described. FIG. 1 is a schematic sectional view of a lithium ion battery 1. For example, as illustrated in FIG. 1, the lithium ion battery 1 is a cylindrical lithium ion battery containing an electrode winding body 20 inside a battery can 11.

Specifically, the lithium ion battery 1 includes, for example, a pair of insulating plates 12 and 13 and the electrode winding body 20 inside the cylindrical battery can 11. However, the lithium ion battery 1 may further include, for example, one or two or more of a positive temperature coefficient (PTC) element, a reinforcing member, and the like inside the battery can 11.

The battery can 11 is a member that mainly houses the electrode winding body 20. The battery can 11 is, for example, a cylindrical vessel having one end surface opened and the other end surface closed. That is, the battery can 11 has an open end surface (open end surface 11N). The battery can 11 contains, for example, one or two or more of metal materials such as iron, aluminum and their alloys. However, one or two or more of metal materials such as nickel may be plated on the surface of the battery can 11, for example.

The insulating plates 12 and 13 are dish-shaped plates having a surface substantially perpendicular to a winding axis (Z axis in FIG. 1) of the electrode winding body 20. Furthermore, the insulating plates 12 and 13 are arranged to sandwich the electrode winding body 20 between them, for example.

At the open end surface 11N of the battery can 11, the battery lid 14 and the safety valve mechanism 30 are crimped with the gasket 15 interposed therebetween, and a crimped structure 11R (crimped structure) is formed. Consequently, the battery can 11 is hermetically sealed in a state in which the electrode winding body 20 and the like are housed inside the battery can 11.

The battery lid 14 is a member that mainly closes the open end surface 11N of the battery can 11 in the state in which the electrode winding body 20 and the like are housed inside the battery can 11. The battery lid 14 contains, for example, a material similar to a material for forming the battery can 11. A central region of the battery lid 14 protrudes, for example, in a +Z direction. Thus, a region (peripheral region) other than the central region of the battery lid 14 is in contact with, for example, the safety valve mechanism 30.

The gasket 15 is a member that mainly seals a gap between the bent portion 11P and the battery lid 14 by being interposed between the battery can 11 (bent portion 11P) and the battery lid 14. However, a surface of the gasket 15 may be coated with asphalt or the like, for example.

The gasket 15 contains, for example, one or two or more of insulating materials. The type of insulating material is not particularly limited, and is, for example, a polymeric material such as polybutylene terephthalate (PBT) and polypropylene (PP). Particularly, the insulating material is preferably polybutylene terephthalate. This is because the gap between the bent portion 11P and the battery lid 14 is sufficiently sealed while the battery can 11 and the battery lid 14 are electrically separated from each other.

When pressure (internal pressure) inside the battery can 11 rises, the safety valve mechanism 30 mainly releases the internal pressure by releasing the hermetically sealed state of the battery can 11 as necessary. The cause of the increase in the internal pressure of the battery can 11 is, for example, a gas generated due to a decomposition reaction of an electrolytic solution during charge and discharge.

In the cylindrical lithium ion battery, a strip-shaped positive electrode 21 and a strip-shaped negative electrode 22 are spirally wound with the separator 23 interposed therebetween, and are accommodated in the battery can 11 in a state of being impregnated with the electrolytic solution. The positive electrode 21 is obtained by forming a positive electrode active material layer 21B on one surface or both surfaces of a positive electrode foil 21A, and a material of the positive electrode foil 21A is, for example, a metal foil made of aluminum or an aluminum alloy. The negative electrode 22 is obtained by forming a negative electrode active material layer 22B on one surface or both surfaces of a negative electrode foil 22A, and a material of the negative electrode foil 22A is, for example, a metal foil made of nickel, a nickel alloy, copper, or a copper alloy. The separator 23 is a porous and insulating film, and enables movement of substances such as ions and an electrolytic solution while electrically insulating the positive electrode 21 and the negative electrode 22.

Although the positive electrode active material layer 21B and the negative electrode active material layer 22B cover many portions of the positive electrode foil 21A and the negative electrode foil 22A, respectively, neither of the active material layers intentionally covers a periphery of one end in a direction of the strip. Hereinafter, the portions not covered with the active material layers 21B and 22B will be appropriately referred to as active material non-covered portions, and the portions covered with the active material layers 21B and 22B will be appropriately referred to as active material covered portions. In the cylindrical battery, the electrode winding body 20 is wound in such a manner that an active material non-covered portion 21C of the positive electrode and an active material non-covered portion 22C of the negative electrode are overlapped each other with the separator 23 interposed therebetween so as to face in opposite directions.

Figure 2:
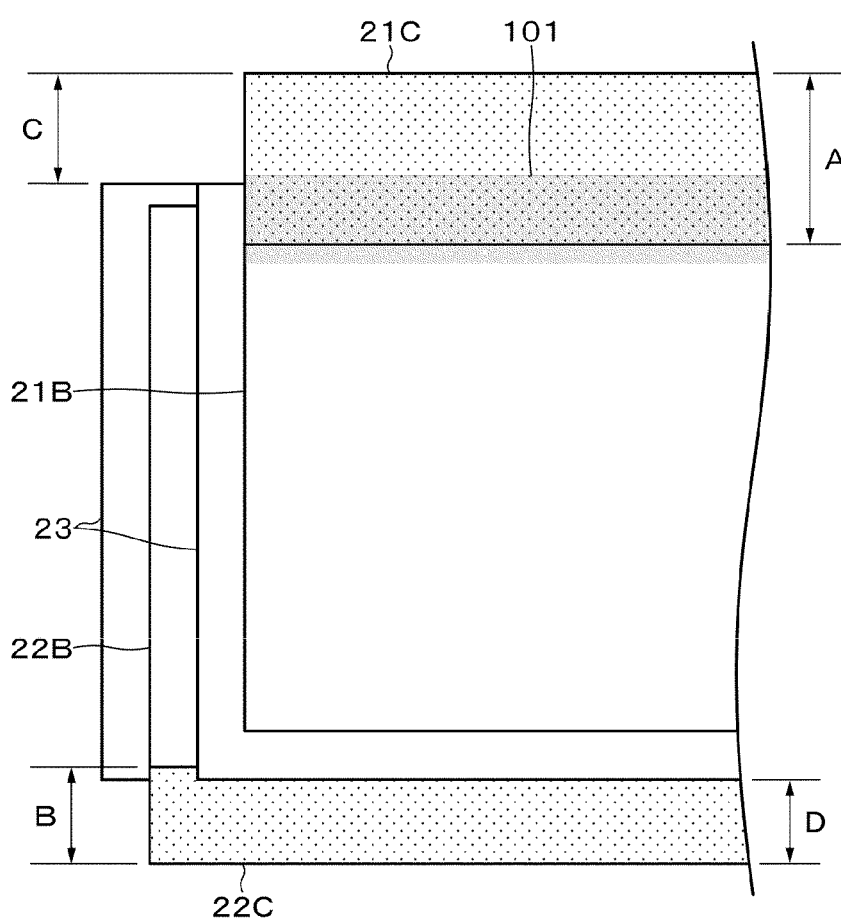
FIG. 2 is a view for explaining an example of an arrangement relationship between a positive electrode, a negative electrode, and a separator in an electrode winding body.

FIG. 2 shows an example of a structure before winding in which the positive electrode 21, the negative electrode 22, and the separator 23 are stacked. A width of the active material non-covered portion 21C (upper dot portion in FIG. 2) of the positive electrode is A, and a width of the active material non-covered portion 22C (lower dot portion in FIG. 2) of the negative electrode is B. In one embodiment, A>B is preferable, for example, A=7 (mm) and B=4 (mm). A length of a portion where the active material non-covered portion 21C of the positive electrode protrudes from one end of the separator 23 in the width direction is C, and a length of a portion where the active material non-covered portion 22C of the negative electrode protrudes from the other end of the separator 23 in the width direction is D. In one embodiment, C>D is preferable, for example, C=4.5 (mm) and D=3 (mm).

The active material non-covered portion 21C of the positive electrode is formed from, for example, aluminum and the like, and the active material non-covered portion 22C of the negative electrode is formed from, for example, copper and the like; therefore, in general, the active material non-covered portion 21C of the positive electrode is softer (has a lower Young's modulus) than the active material non-covered portion 22C of the negative electrode. Thus, in one embodiment, A>B and C>D are more preferable, and in this case, when the active material non-covered portion 21C of the positive electrode and the active material non-covered portion 22C of the negative electrode are simultaneously bent at the same pressure from both electrode sides, a height of the bent portion measured from a tip of the separator 23 may be substantially the same between the positive electrode 21 and the negative electrode 22. At this time, since the active material non-covered portions 21C and 22C are bent and suitably overlap each other, the active material non-covered portions 21C and 22C and current collector plates 24 and 25 can be easily joined by laser welding. Although joining in one embodiment means joining by laser welding, the joining method is not limited to laser welding.

In the positive electrode 21, a section having a width of 3 mm and including a boundary between the active material non-covered portion 21C and the active material covered portion 21B is covered with an insulating layer 101 (gray region portion in FIG. 2). The entire region of the active material non-covered portion 21C of the positive electrode facing the active material covered portion 22B of the negative electrode with the separator interposed therebetween is covered with the insulating layer 101. The insulating layer 101 has an effect of reliably preventing an internal short circuit of the battery 1 when a foreign matter enters between the active material covered portion 22B of the negative electrode and the active material non-covered portion 21C of the positive electrode. In addition, the insulating layer 101 has an effect of absorbing an impact when the impact is applied to the battery 1 and reliably preventing the active material non-covered portion 21C of the positive electrode from being bent or being short-circuited to the negative electrode 22.

A through hole 26 is formed in a central axis of the electrode winding body 20. The through hole 26 is a hole into which a winding core for assembling the electrode winding body 20 and an electrode rod for welding are inserted. Since the electrode winding body 20 is wound in an overlapping manner such that the active material non-covered portion 21C of the positive electrode and the active material non-covered portion 22C of the negative electrode face in opposite directions, the active material non-covered portion 21C of the positive electrode gathers on one end surface (end surface 41) of the electrode winding body, and the active material non-covered portion 22C of the negative electrode gathers on the other end surface (end surface 42) of the electrode winding body 20. In order to improve contact with the current collector plates 24 and 25 for extracting current, the active material non-covered portions 21C and 22C are bent, and the end surfaces 41 and 42 are flat surfaces. The bending direction is a direction from outer edge portions 27 and 28 of the end surfaces 41 and 42 toward the through hole 26, and the active material non-covered portions of adjacent peripheries overlap each other and are bent in a wound state. In the present specification, the "flat surface" includes not only an absolutely flat surface but also a surface having some unevenness and surface roughness to the extent that the active material non-covered portion and the current collector plate can be joined.

When the active material non-covered portions 21C and 22C are bent so as to overlap each other, at first it appears that the end surfaces 41 and 42 can be made flat; however, if no processing is performed before bending, wrinkles or voids (spaces) are generated in the end surfaces 41 and 42 at the time of bending, and the end surfaces 41 and 42 do not become flat surfaces. Here, "wrinkles" and "voids" are portions where unevenness occurs in the bent active material non-covered portions 21C and 22C, and the end surfaces 41 and 42 do not become flat surfaces. In order to prevent the occurrence of wrinkles and voids, a groove 43 (see, for example, FIG. 4B) is formed in advance in a radial direction from the through hole 26. The groove 43 extends from the outer edge portions 27 and 28 of the end surfaces 41 and 42 to the through hole 26. The through hole 26 is provided at the center of the electrode winding body 20, and the through hole 26 is used as a hole into which a welding tool is inserted in an assembly process of the lithium ion battery 1. The active material non-covered portions 21C and 22C at the start of winding of the positive electrode 21 and the negative electrode 22 near the through hole 26 have cut-outs. This is to prevent the through hole 26 from being closed at the time of bending toward the through hole 26. The groove 43 remains in the flat surface after the active material non-covered portions 21C and 22C are bent, and a portion without the groove 43 is joined (welded or the like) to the positive electrode current collector plate 24 or the negative electrode current collector plate 25. Not only the flat surface but also the groove 43 may be joined to a part of the current collector plates 24 and 25.

A detailed configuration of the electrode winding body 20, that is, detailed configurations of the positive electrode 21, the negative electrode 22, the separator 23, and the electrolytic solution will be described later.

In a normal lithium ion battery, for example, a lead for current extraction is welded to each one portion of the positive electrode and the negative electrode; however, this is not suitable for high rate discharge because the internal resistance of the battery is large, and the lithium ion battery generates heat and becomes high temperature during discharge. Thus, in the lithium ion battery of one embodiment, the positive electrode current collector plate 24 and the negative electrode current collector plate 25 are arranged on the end surfaces 41 and 42, and are welded to the active material non-covered portions 21C and 22C of the positive electrode and the negative electrode present on the end surfaces 41 and 42 at multiple points, thereby suppressing the internal resistance of the battery to be low. The end surfaces 41 and 42 being bent to be flat surfaces also contributes to the reduction in resistance.

Figure 3:
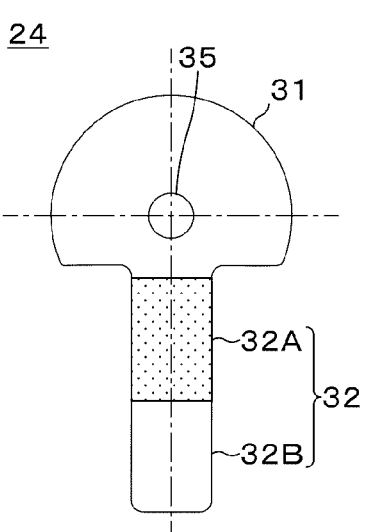
FIG. 3 includes views A and B, where A is a plan view of a positive electrode current collector plate, and where B is a plan view of a negative electrode current collector plate.
Figure 3:
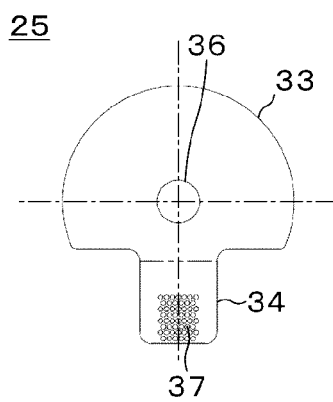

FIGS. 3A and 3B show an example of the current collector plate. FIG. 3A shows the positive electrode current collector plate 24, and FIG. 3B shows the negative electrode current collector plate 25. The material of the positive electrode current collector plate 24 is, for example, a metal plate made of a simple substance or a composite of aluminum or an aluminum alloy, and the material of the negative electrode current collector plate 25 is, for example, a metal plate made of a simple substance or a composite of nickel, a nickel alloy, copper, or a copper alloy. As shown in FIG. 3A, the positive electrode current collector plate 24 has a shape in which a rectangular strip-shaped portion 32 is attached to a plate-shaped portion 31 having a flat fan shape. A hole 35 is formed near the center of the plate-shaped portion 31, and the position of the hole 35 is a position corresponding to the through hole 26.

A portion indicated by dots in FIG. 3A is an insulating portion 32A in which an insulating tape is attached to the strip-shaped portion 32 or an insulating material is applied, and a portion below the dot portion in the drawing is a connecting portion 32B to a sealing plate also serving as an external terminal. In the case of a battery structure in which a metal center pin (not shown) is not provided in the through hole 26, there is a low possibility that the strip-shaped portion 32 comes into contact with a portion having a negative electrode potential, and therefore, the insulating portion 32A may not be provided. In this case, a width between the positive electrode 21 and the negative electrode 22 can be increased by an amount corresponding to a thickness of the insulating portion 32A to increase a charge/discharge capacity.

The negative electrode current collector plate 25 has substantially the same shape as the positive electrode current collector plate 24, but has a different strip-shaped portion. The strip-shaped portion 34 of the negative electrode current collector plate in FIG. 3B is shorter than the strip-shaped portion 32 of the positive electrode current collector plate, and has no portion corresponding to the insulating portion 32A. The strip-shaped portion 34 includes a circular protrusion (projection) 37 indicated by a plurality of circles. During resistance welding, current is concentrated on the protrusion, and the protrusion is melted to weld the strip-shaped portion 34 to a bottom of the battery can 11. Similarly to the positive electrode current collector plate 24, in the negative electrode current collector plate 25, a hole 36 is formed near the center of a plate-shaped portion 33, and the position of the hole 36 is a position corresponding to the through hole 26. The plate-shaped portion 31 of the positive electrode current collector plate 24 and the plate-shaped portion 33 of the negative electrode current collector plate 25 have a fan shape, and thus cover a part of the end surfaces 41 and 42. The reason for not covering the whole is to allow the electrolytic solution to smoothly permeate the electrode winding body when the battery is assembled, or to easily release gas generated when the battery is in an abnormally high temperature state or an overcharged state to the outside of the battery.

The active material covered portion 21B of the positive electrode contains at least a positive electrode material (positive electrode active material) capable of occluding and releasing lithium, and may further contain a positive electrode binder, a positive electrode conductive agent, and the like. The positive electrode material is preferably a lithium-containing composite oxide or a lithium-containing phosphate compound. The lithium-containing composite oxide has, for example, a layered rock salt-type or spinel-type crystal structure. The lithium-containing phosphate compound has, for example, an olivine type crystal structure.

The positive electrode binder contains synthetic rubber or a polymer compound. The synthetic rubber includes styrene-butadiene-based rubber, fluororubber, ethylene propylene diene, and the like. The polymer compounds includes polyvinylidene fluoride (PVdF), polyimide, and the like.

The positive electrode conductive agent is a carbon material such as graphite, carbon black, acetylene black, or Ketjen black. However, the positive electrode conductive agent may be a metal material and a conductive polymer.

A surface of the negative electrode foil 22A is preferably roughened for improving close-contact characteristics with the negative electrode active material layer 22B. The negative electrode active material layer 22B contains at least a negative electrode material (negative electrode active material) capable of occluding and releasing lithium, and may further contain a negative electrode binder, a negative electrode conductive agent, and the like.

The negative electrode material contains, for example, a carbon material. The carbon material is easily graphitizable carbon, non-graphitizable carbon, graphite, low crystalline carbon, or amorphous carbon. The shape of the carbon material is fibrous, spherical, granular, or scaly.

The negative electrode material contains, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include silicon oxide ($SiO_x$ ($0<x≤2$)), silicon carbide (SiC), an alloy of carbon and silicon, and lithium titanate (LTO).

The separator 23 is a porous film containing a resin, and may be a stacked film of two or more kinds of porous films. Examples of the resin include polypropylene and polyethylene. The separator 23 may include a resin layer on one side or both sides of a porous membrane as a substrate layer. The reason for this is that, this allows for an improvement in close-contact characteristics of the separator 23 with respect to each of the positive electrode 21 and the negative electrode 22, thereby suppressing distortion of the electrode winding body 20.

The resin layer contains a resin such as PVdF. When the resin layer is formed, the base material layer is coated with a solution prepared by dissolving the resin in an organic solvent, and thereafter, the substrate layer is dried. Alternatively, the base material layer may be immersed in the solution, and thereafter the substrate layer may be dried. The resin layer preferably contains inorganic particles or organic particles from the viewpoint of improving heat resistance and safety of the battery. The type of the inorganic particles is aluminum oxide, aluminum nitride, aluminum hydroxide, magnesium hydroxide, boehmite, talc, silica, mica, or the like. In place of the resin layer, a surface layer formed by a sputtering method, an ALD (atomic layer deposition) method, and other methods and mainly composed of inorganic particles may be used.

The electrolytic solution contains a solvent and an electrolyte salt, and may further contain an additive and the like as necessary. The solvent is a non-aqueous solvent such as an organic solvent, or water. An electrolytic solution containing a non-aqueous solvent is referred to as a non-aqueous electrolytic solution. The non-aqueous solvent is a cyclic carbonate ester, a chain carbonate ester, lactone, a chain carboxylic ester, or nitrile (mononitrile).

Although a representative example of the electrolyte salt is a lithium salt, a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methane-sulfonate ($LiCH_3SO_3$), lithium trifluoromethanesulfonate ($LiCF_3SO_3$), and dilithium hexafluorosilicate ($Li_2SF_6$). These salts may be used in mixture, and among them, it is preferable to use $LiPF_6$ and $LiBF_4$ in mixture from the viewpoint of improving battery characteristics. The content of the electrolyte salt is not particularly limited, and is preferably from 0.3 mol/kg to 3 mol/kg with respect to the solvent.

A method for producing the lithium ion battery 1 of one embodiment will be described with reference to FIGS. 4A to 4F. First, the positive electrode active material was applied and attached to a surface of the strip-shaped positive elec-trode foil 21A to form a covered portion of the positive electrode 21, and the negative electrode active material was applied to a surface of the strip-shaped negative electrode foil 22A to form a covered portion of the negative electrode 22. At this time, the active material non-covered portions 21C and 22C not applied and attached with the positive electrode active material and the negative electrode active material were produced at one end in a transverse direction of the positive electrode 21 and one end in a transverse direction of the negative electrode 22. A cut-out was formed in a part of the active material non-covered portions 21C and 22C, the part corresponding to the winding start at the time of winding. Steps such as drying were performed on the positive electrode 21 and the negative electrode 22. The active material non-covered portion 21C of the positive electrode and the active material non-covered portion 22C of the negative electrode were overlapped with the separator 23 interposed therebetween so as to be in opposite directions, and wound in a spiral shape so as to form the through hole 26 in the central axis and to dispose the formed cut-out near the central axis, thereby producing the electrode winding body 20 as shown in FIG. 4A.

Figure 4:
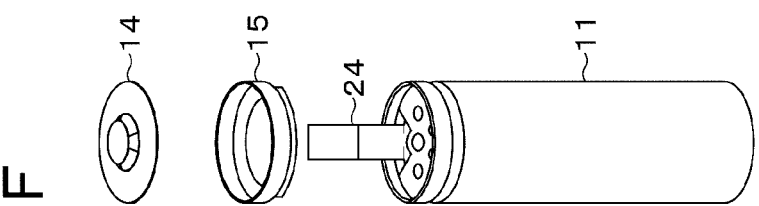
FIG. 4 includes view A to F which are views for explaining an assembly process of the battery according to an embodiment.
Figure 4:
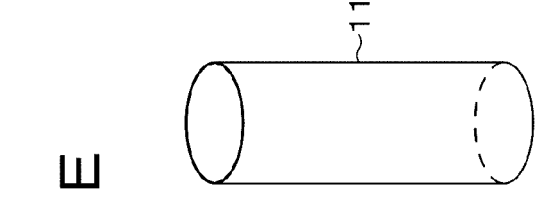
Figure 4:
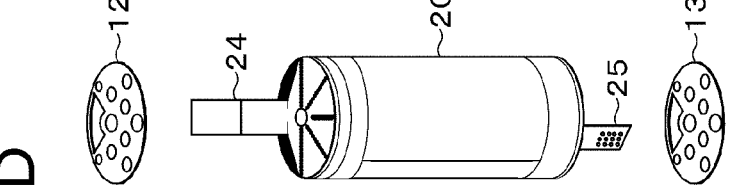
Figure 4:
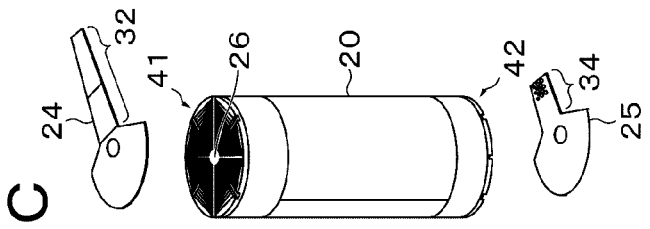
Figure 4:
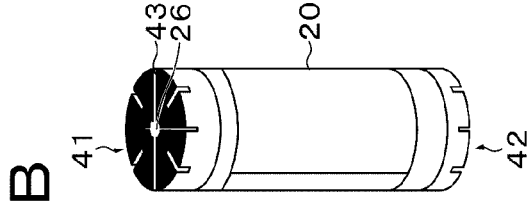
Figure 4:
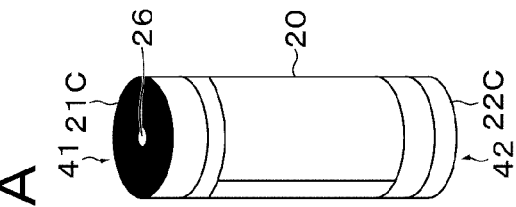

Next, as shown in FIG. 4B, by perpendicularly pressing an end of a thin flat plate (for example, a thickness of 0.5 mm) or the like against the end surfaces 41 and 42, the end surfaces 41 and 42 were locally bent to produce the groove 43. In this way, the groove 43 extending radially from the through hole 26 toward the central axis was produced. The number and arrangement of the grooves 43 shown in FIG. 4B are merely examples. As shown in FIG. 4C, the same pressure was simultaneously applied from both electrode sides in a direction substantially perpendicular to the end surfaces 41 and 42, and the active material non-covered portion 21C of the positive electrode and the active material non-covered portion 22C of the negative electrode were bent to form the end surfaces 41 and 42 to be flat surfaces. At this time, a load was applied with a flat plate surface or the like such that the active material non-covered portions on the end surfaces 41 and 42 were bent by overlapping toward the through hole 26 side. Thereafter, the plate-shaped portion 31 of the positive electrode current collector plate 24 was laser-welded to the end surface 41, and the plate-shaped portion 33 of the negative electrode current collector plate 25 was laser-welded to the end surface 42.

Thereafter, as shown in FIG. 4D, the strip-shaped portions 32 and 34 of the current collector plates 24 and 25 were bent, the insulating plates 12 and 13 (or insulating tapes) were attached to the positive electrode current collector plate 24 and the negative electrode current collector plate 25, and the electrode winding body 20 assembled as described above was inserted into the battery can 11 shown in FIG. 4E to weld the bottom of the battery can 11. After the electrolytic solution was injected into the battery can 11, sealing was performed with the gasket 15 and the battery lid 14 as shown in FIG. 4F.

EXAMPLES

Hereinafter, the present application will be described based on Examples in which the number of occurrences of defects and an internal resistance value in a burner test are compared using the lithium ion battery 1 produced as described above. The present application is not limited to Examples described below.

In all of the following Examples and Comparative Examples, the battery size was 21700 (diameter: 21 mm, height: 70 mm), the width of the active material covered portion 21B of the positive electrode was 59 mm, the width of the active material covered portion 22B of the negative electrode was 62 mm, and the width of the separator 23 was 64 mm. The separator 23 was overlapped so as to cover the entire range of the active material covered portion 21B of the positive electrode and the active material covered portion 22B of the negative electrode, the width of the active material non-covered portion 21C of the positive electrode was 7 mm, and the width of the active material non-covered portion 22C of the negative electrode was 4 mm. In all Examples and Comparative Examples, the number of the grooves 43 was eight, and the grooves were arranged at substantially equal angular intervals.

FIGS. 6A to 10A and FIGS. 13A to 19A show a position and a shape of the positive electrode current collector plate 24 on the end surface 41, and FIGS. 6B to 10B and FIGS. 13B to 19B show a position and a shape of the negative electrode current collector plate 25 on the end surface 42. FIGS. 6C to 10C and FIGS. 13C to 19C (C in each drawing) are views obtained by superimposing the positive electrode current collector plate 24 in FIGS. 6A to 10A and FIGS. 13A to 19A (A in each drawing) and the negative electrode current collector plate 25 in FIGS. 6B to 10B and FIGS. 13B to 19B (B in each drawing) when viewed from a direction (Z-axis direction in FIG. 1) of the central axis of the electrode winding body 20. An area where the positive electrode current collector plate 24 and the negative electrode current collector plate 25 overlap each other when viewed from the direction of the central axis of the electrode winding body 20 is defined as S1. That is, S1 is an area where the positive electrode current collector plate 24 and the negative electrode current collector plate 25 overlap each other in FIGS. 6C to 10C and FIGS. 13C to 19C.

Figure 5:
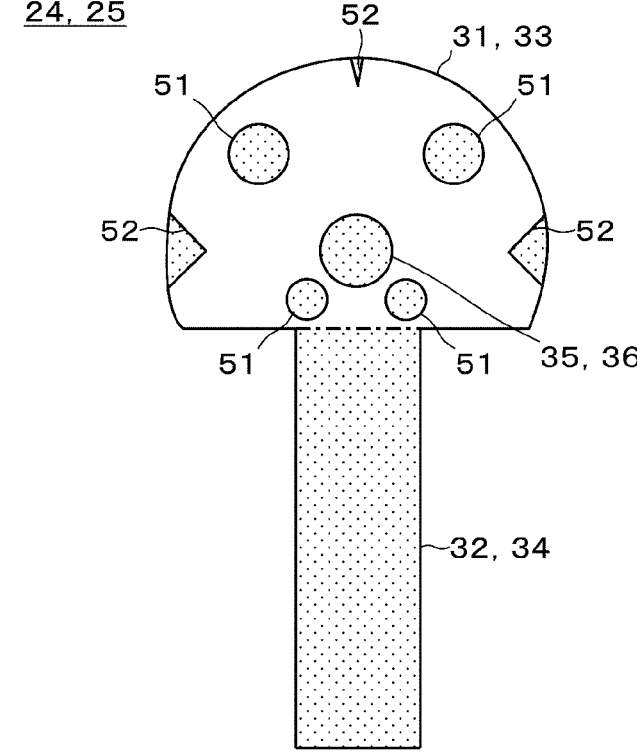
FIG. 5 is a view for explaining a structure in which the current collector plate has a hole and a cut-out.
Figure 6:
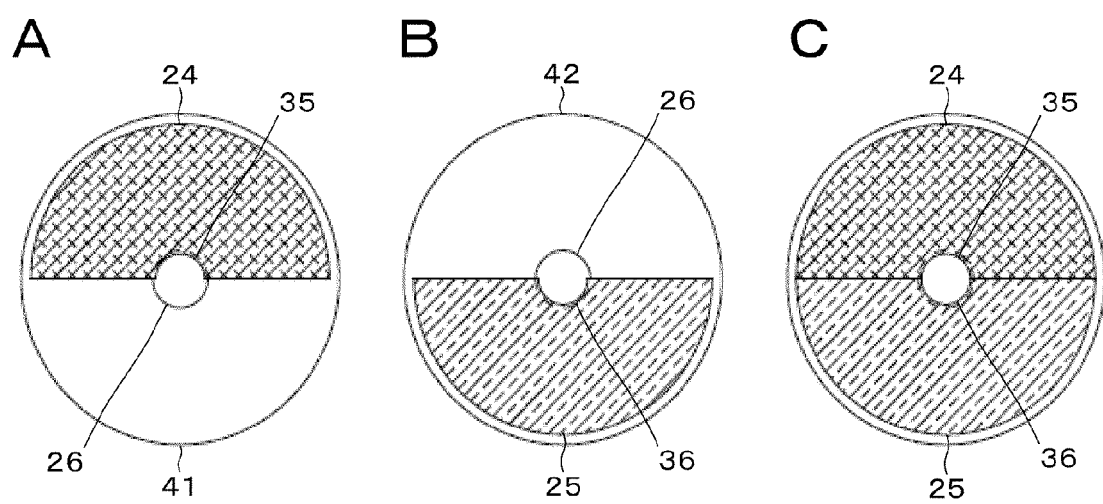
FIG. 6 includes view A to C which are views for explaining Example 1.
Figure 7:
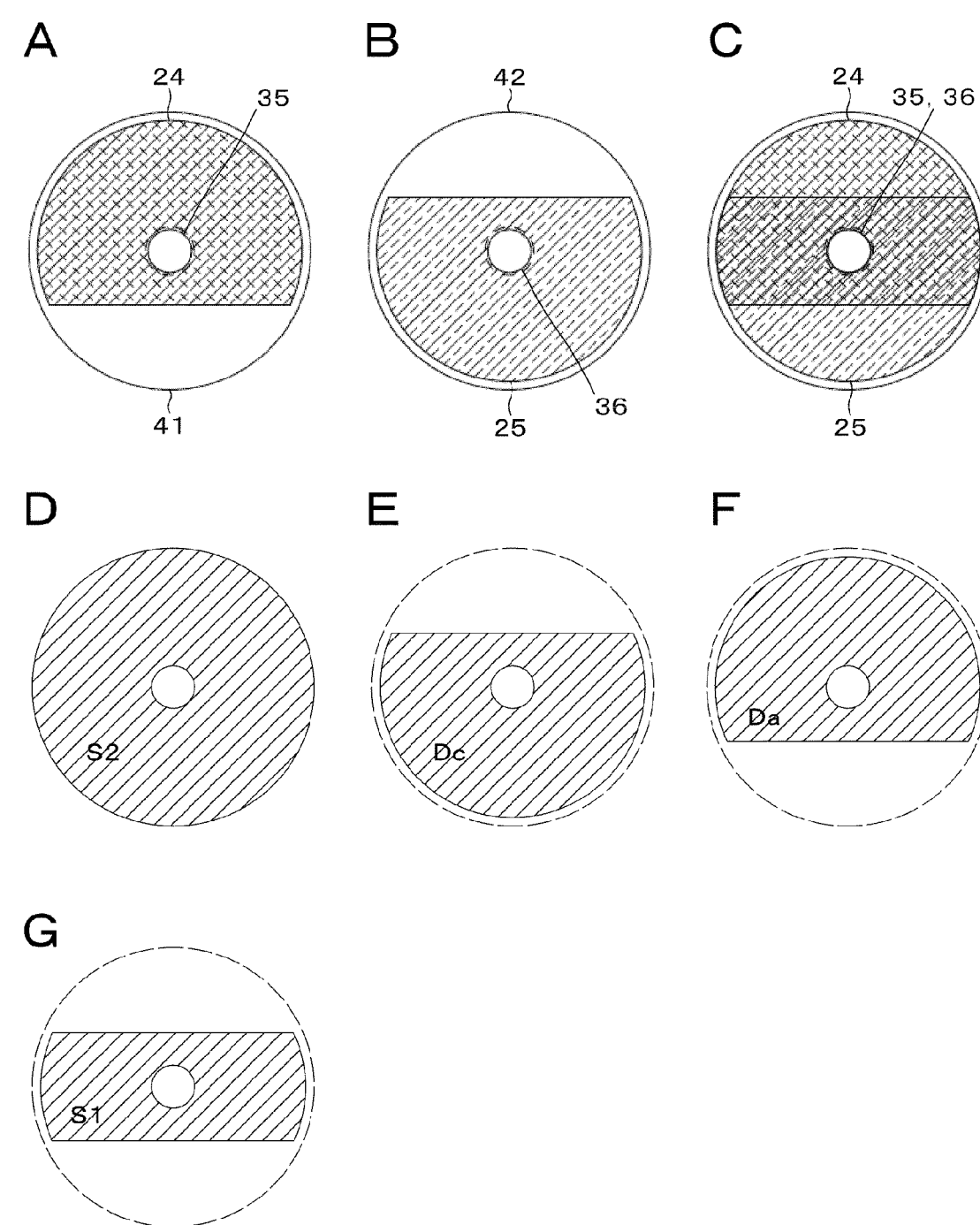
FIG. 7 includes views A to G which are views for explaining Example 2.
Figure 8:
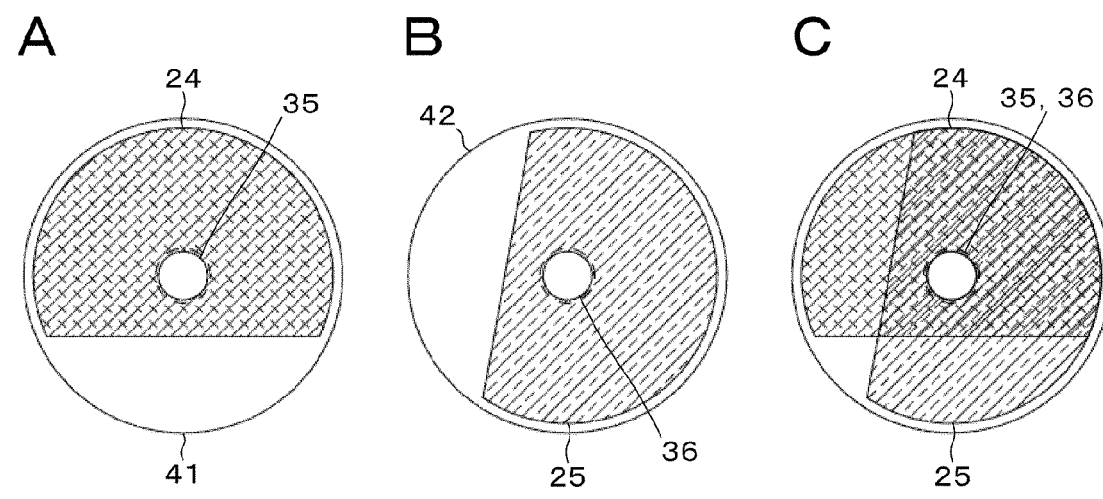
FIG. 8 includes views A to C which are views for explaining Example 3.
Figure 9:
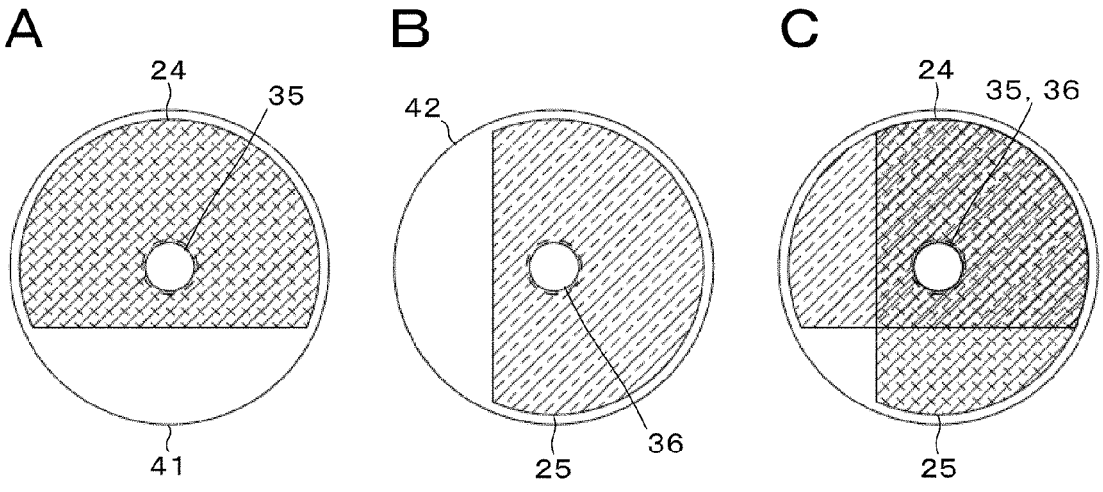
FIG. 9 includes views A to C which are views for explaining Comparative Example 1.
Figure 10:
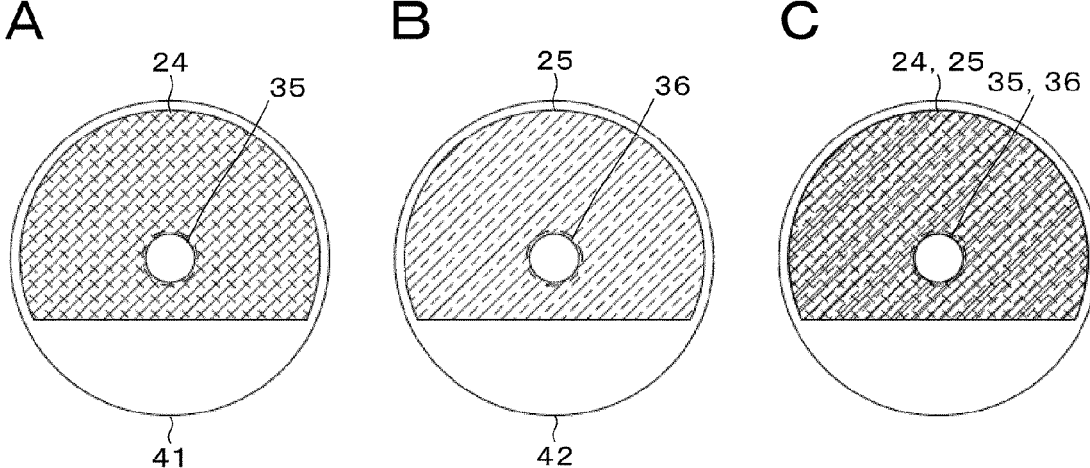
FIG. 10 includes views A to C which are views for explaining Comparative Example 2.

An area where the plate-shaped portion 31 of the positive electrode current collector plate 24 covers the active mate-rial non-covered portion 21C of the positive electrode on the end surface 41 was defined as Dc, and an area where the plate-shaped portion 33 of the negative electrode current collector plate 25 covers the active material non-covered portion 22C of the negative electrode on the end surface 42 was defined as Da. A smaller value of Dc and Da was defined as D. When Dc=Da, it is defined as D=Dc=Da. A sectional area of the electrode winding body 20 when a central portion of the electrode winding body 20 is cut in a direction perpendicular to the central axis of the electrode winding body 20 was defined as S2, and in the following, S2=315.1 $mm^2$. In the plate-shaped portion 31 of the positive electrode current collector plate 24 and the plate-shaped portion 33 of the negative electrode current collector plate 25, as shown in FIG. 5, a small hole 51 and a cut-out 52 may be formed in the plate-shaped portions 31 and 33. Here, areas (dot portion in FIG. 5) of the hole 51, the cut-out 52, and the strip-shaped portions 32 and 34 are defined as not included in Dc and Da.

Example 1

Dc=Da=145.3 mm². The positive electrode current collector plate 24 on the end surface 41 was disposed as shown in FIG. 6A, the negative electrode current collector plate 25 on the end surface 42 was disposed as shown in FIG. 6B, and S1=0 mm² as shown in FIG. 6C.

Example 2

Dc=Da=217.0 mm². The positive electrode current collector plate 24 on the end surface 41 was disposed as shown in FIG. 7A, the negative electrode current collector plate 25 on the end surface 42 was disposed as shown in FIG. 7B, and S1=138.0 mm² as shown in FIG. 7C. The area S2, the area Dc, the area Da, and the area S1 in Example 2 are the ranges of the shaded portions in FIGS. 7D, 7E, 7F, and 7G, respectively.

CC/CV charge, 4.2 V/2A, and 100 mAcut until the battery was fully charged. In the burner test, combustion was performed using a gas burner in an octagonal aluminum net (Φ 0.25 mm, 16-18 wires/inch) having a distance between the diagonal planes of 61 cm and a height of 30.5 cm. A screen (20 opening/inch, Φ 0.43 mm iron wire) of a platform with a hole of 102 mm in the central portion was installed 38 mm above a mouth of the burner. A gas flow rate of the burner was set to 500 ml/min (methane) and 150 to 175 ml/min (propane), the battery was placed on the screen (the battery was not fixed unless moved to the end) in a state in which the screen was made red with a bright blue burner flame, and combustion was performed. In the burner test, 100 samples were tested, the battery or a portion of the battery penetrating an enclosure (test net) was determined to be defective, and the number of determined defectives was counted, and regarded as the number of defectives in the burner test. The results are shown below.

TABLE 1

| | Area Dc of positive electrode current collector plate (mm²) | Area Da of negative electrode current collector plate (mm²) | Area S1 where current collectors overlap each other (mm²) | S1/S2 | D/S2 | The number of defectives in burner test | Initial internal resistance (mΩ) |
|---|---|---|---|---|---|---|---|
| Example 1 | 145.3 | 145.3 | 0.0 | 0.00 | 0.46 | 2 | 9.88 |
| Example 2 | 217.0 | 217.0 | 138.0 | 0.44 | 0.69 | 2 | 9.90 |
| Example 3 | 217.0 | 217.0 | 153.8 | 0.49 | 0.69 | 4 | 9.83 |
| Comparative Example 1 | 217.0 | 217.0 | 158.4 | 0.50 | 0.69 | 11 | 9.86 |
| Comparative Example 2 | 217.0 | 217.0 | 217.0 | 0.69 | 0.69 | 14 | 9.91 |

Example 3

Dc=Da=217.0 mm². The positive electrode current collector plate 24 on the end surface 41 was disposed as shown in FIG. 8A, the negative electrode current collector plate 25 on the end surface 42 was disposed as shown in FIG. 8B, and S1=153.8 mm² as shown in FIG. 8C.

Comparative Example 1

Dc=Da=217.0 mm². The positive electrode current collector plate 24 on the end surface 41 was disposed as shown in FIG. 9A, the negative electrode current collector plate 25 on the end surface 42 was disposed as shown in FIG. 9B, and S1=158.4 mm² as shown in FIG. 9C.

Comparative Example 2

Dc=Da=217.0 mm². The positive electrode current collector plate 24 on the end surface 41 was disposed as shown in FIG. 10A, the negative electrode current collector plate 25 on the end surface 42 was disposed as shown in FIG. 10B, and S1=217.0 mm² as shown in FIG. 10C.

Figure 11:
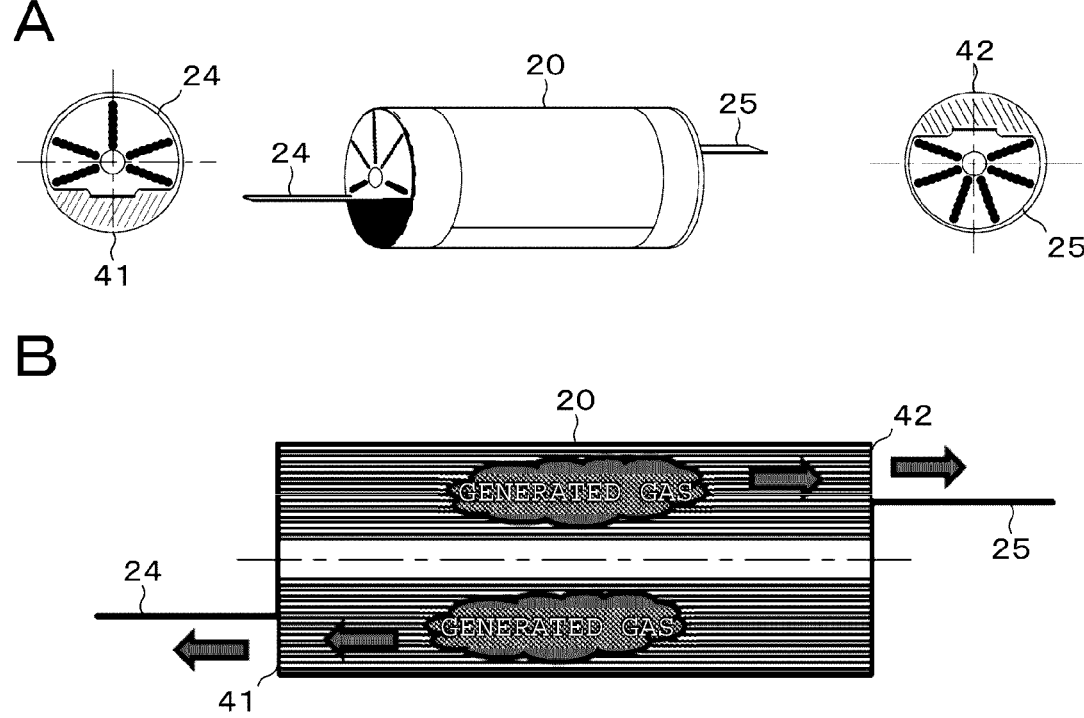
FIG. 11 includes views A and B, where A is a front view and a side view for explaining Example 1 and Example 2, and where B is a schematic view for explaining easiness of gas release in a structure shown in A.
Figure 12:
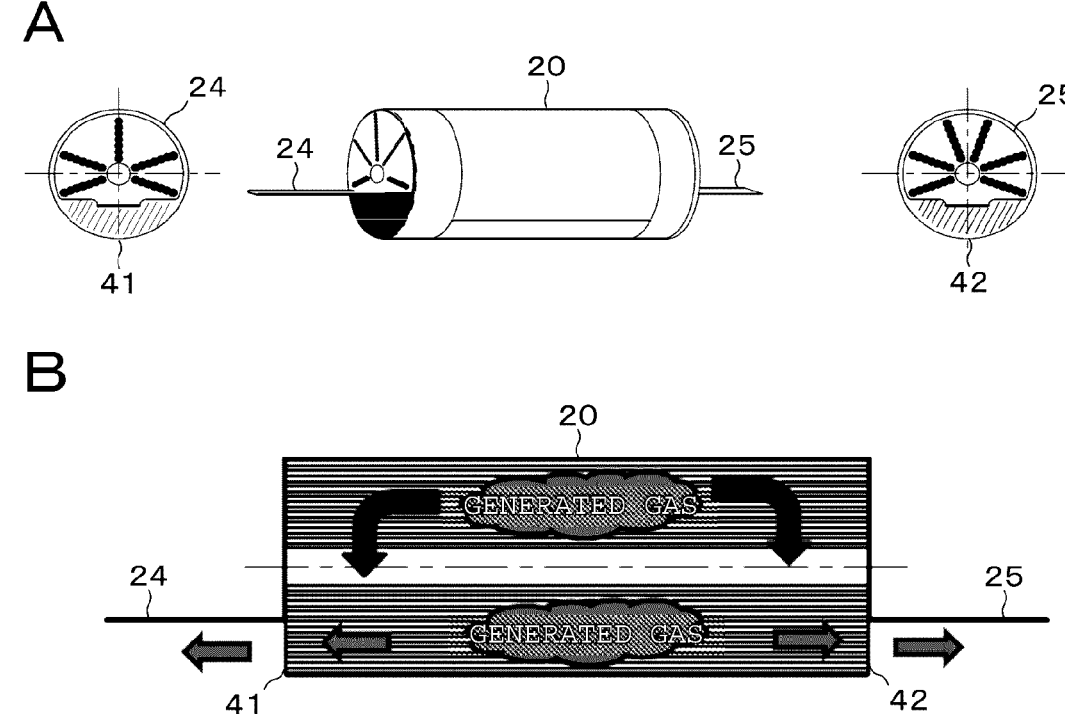
FIG. 12 includes views A and B, where A is a front view and a side view for explaining Comparative Example 2, and where B is a schematic view for explaining easiness of gas release in a structure of FIG. 12A.
Figure 13:
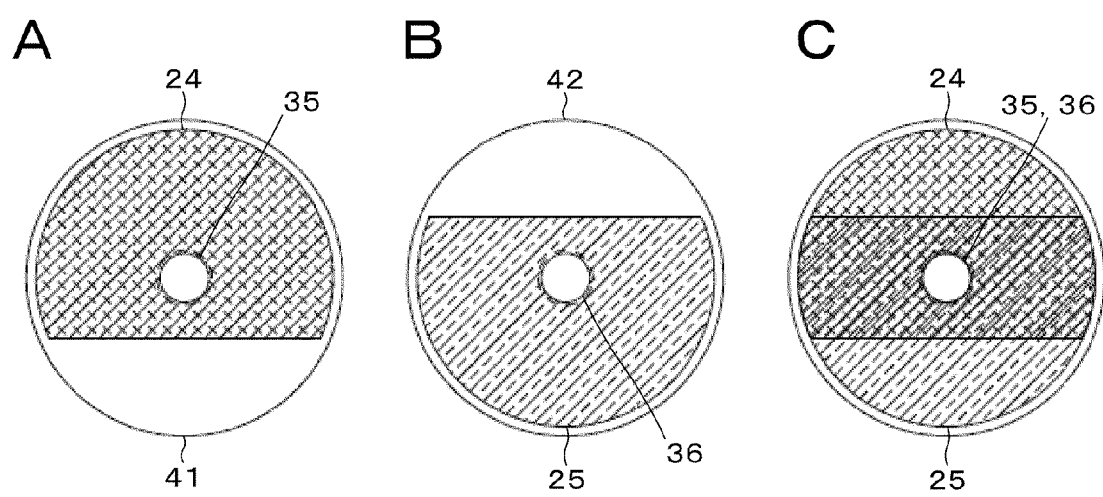
FIG. 13 includes views A to C which are views for explaining Example 11.
Figure 14:
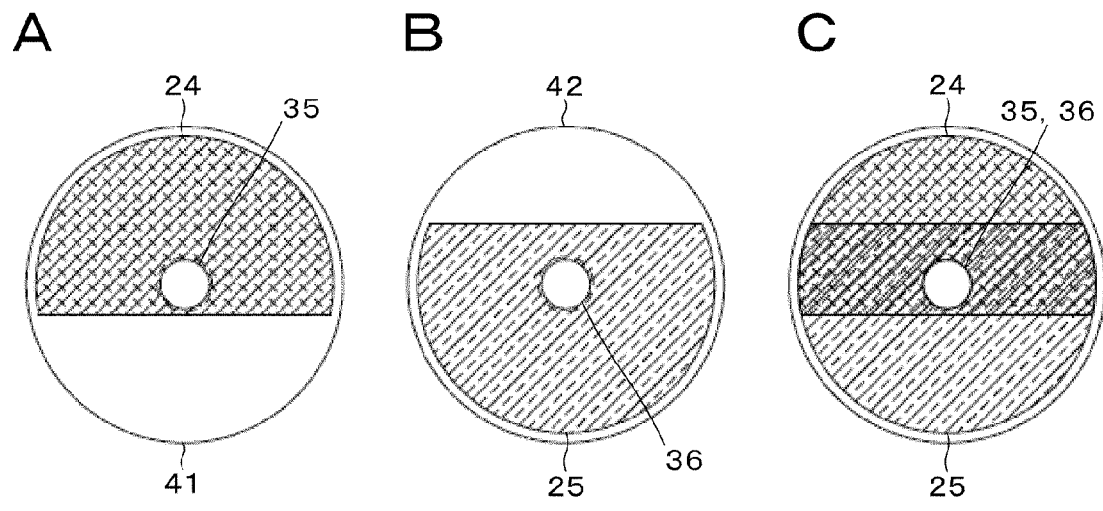
FIG. 14 includes views A to C which are views for explaining Example 12.
Figure 15:
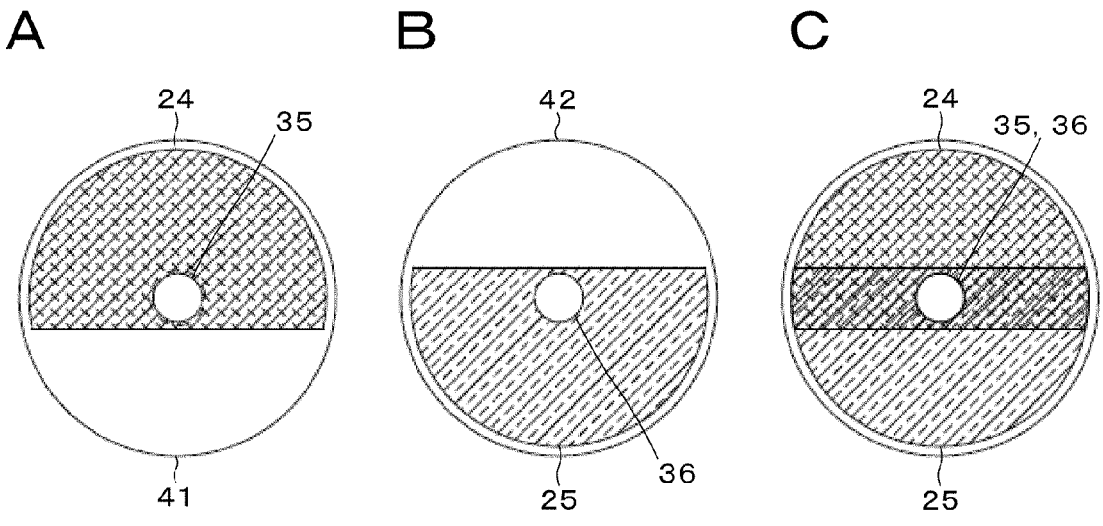
FIG. 15 includes views A to C which are views for explaining Example 13.
Figure 16:
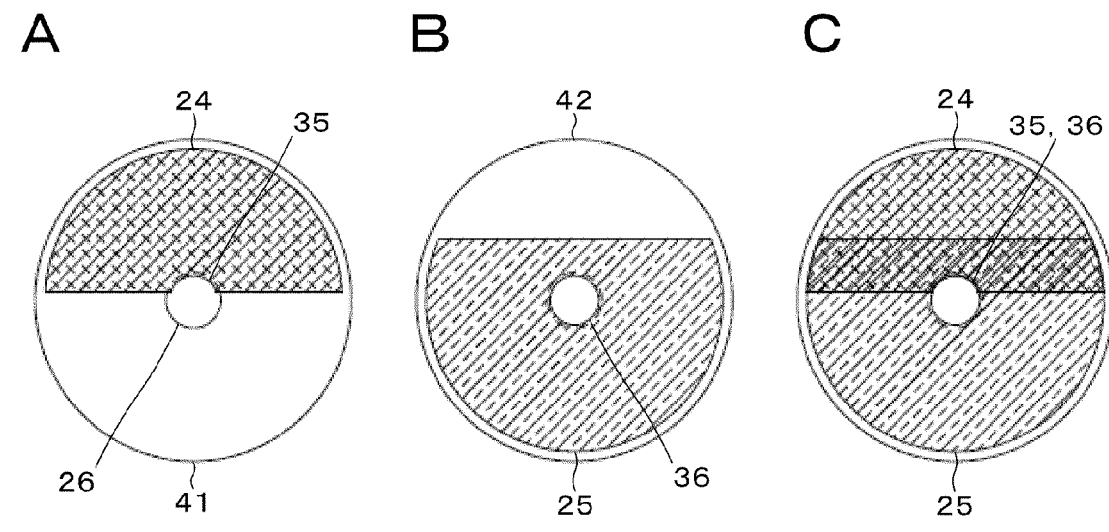
FIG. 16 includes views A to C which are views for explaining Example 14.
Figure 17:
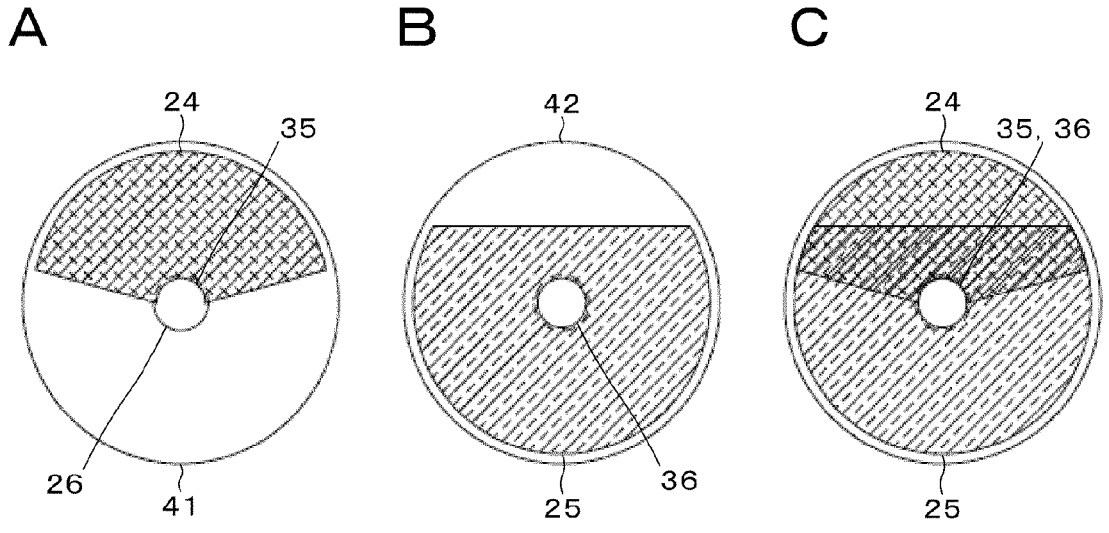
FIG. 17 includes views A to C which are views for explaining Example 15.
Figure 18:
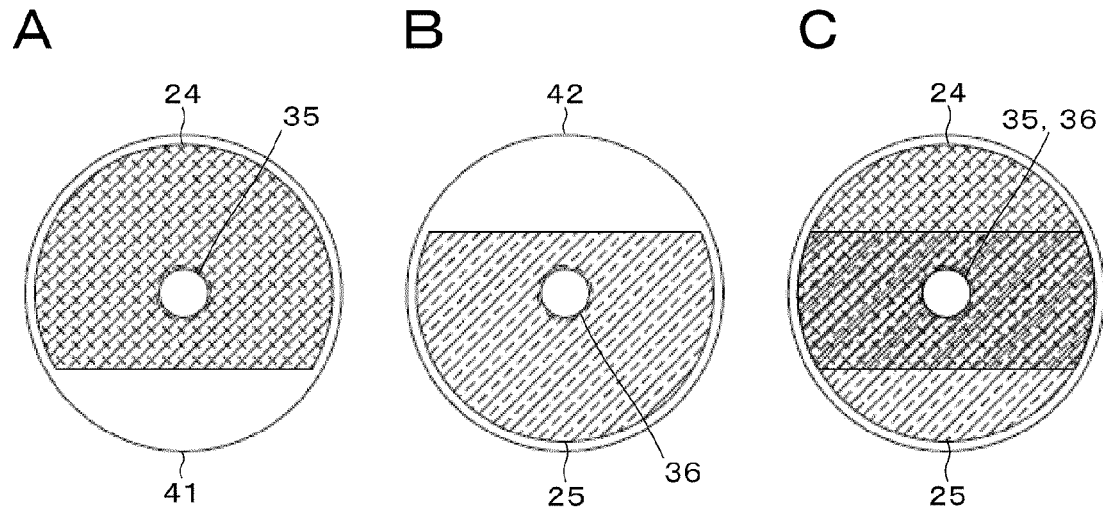
FIG. 18 includes views A to C which are views for explaining Comparative Example 11.
Figure 19:
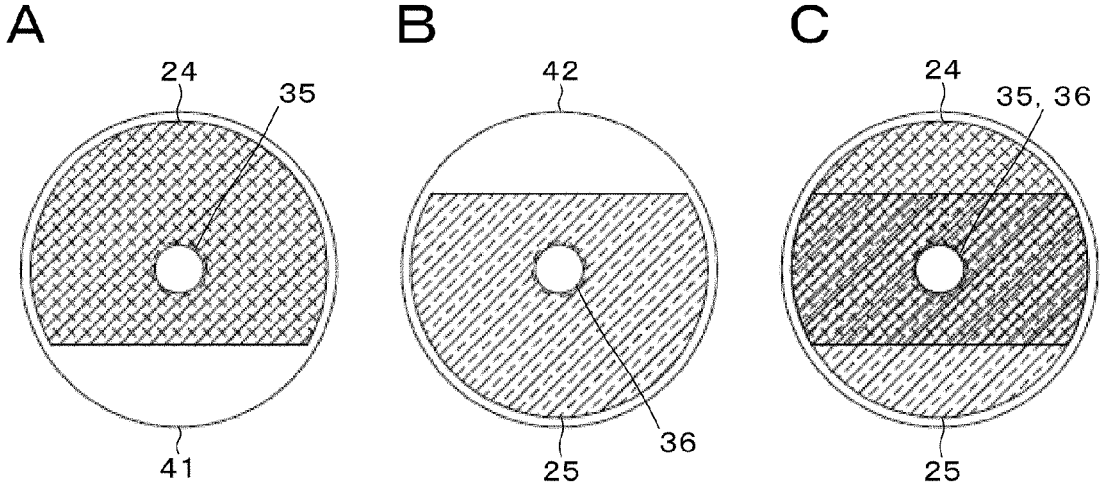
FIG. 19 includes views A to C which are views for explaining Comparative Example 12.

The battery 1 of the above example was assembled and charged, a value of initial internal resistance of the battery was obtained, and a burner test was performed. The value of the initial internal resistance is DCR (direct-current resistance value), which is an average value of 100 samples. The burner test is based on UL 1642 projectile test. Before the burner test, the battery was charged under the conditions of In Examples 1 to 3, the number of defectives in the burner test was 4 or less, which was relatively low, whereas in Comparative Examples 1 and 2, the number of defectives was 11 or more, which was relatively high. In particular, in the structures of Examples 1 and 2, as shown in FIGS. 11A and 11B, a gas easily releases from portions (shaded portions in FIG. 11A) where the end surfaces 41 and 42 are exposed. On the other hand, in the structure of Comparative Example 2, as shown in FIGS. 12A and 12B, the gas can be discharged from the portions (shaded portions in FIG. 12A) where the end surfaces 41 and 42 are exposed; however, the gas hardly releases from the other portion. This is considered to be related to the number of defectives in the burner test. In Examples 1 to 3, 0≤S1/S2≤0.49, and D/S2≥0.46.

Example 11

Dc=Da=217.0 mm². The positive electrode current collector plate 24 on the end surface 41 was disposed as shown in FIG. 13A, the negative electrode current collector plate 25 on the end surface 42 was disposed as shown in FIG. 13B, and S1=138.0 mm² as shown in FIG. 13C.

Example 12

Dc=180.0 mm², and Da=217.0 mm². The positive electrode current collector plate 24 on the end surface 41 was disposed as shown in FIG. 14A, the negative electrode current collector plate 25 on the end surface 42 was disposed as shown in FIG. 14B, and S1=106.5 mm² as shown in FIG. 14C.

US 12,651,778 B2

13

Example 13

Dc=Da=180.0 mm². The positive electrode current collector plate 24 on the end surface 41 was disposed as shown in FIG. 15A, the negative electrode current collector plate 25 on the end surface 42 was disposed as shown in FIG. 15B, and S1=69.5 mm² as shown in FIG. 15C.

Example 14

Dc=136.0 mm², and Da=217.0 mm². The positive electrode current collector plate 24 on the end surface 41 was disposed as shown in FIG. 16A, the negative electrode current collector plate 25 on the end surface 42 was disposed as shown in FIG. 16B, and S1=62.4 mm² as shown in FIG. 16C.

Example 15

Dc=127.8 mm², and Da=234.4 mm². The positive electrode current collector plate 24 on the end surface 41 was disposed as shown in FIG. 17A, the negative electrode current collector plate 25 on the end surface 42 was disposed as shown in FIG. 17B, and S1=71.6 mm² as shown in FIG. 17C.

Comparative Example 11

Dc=234.4 mm², and Da=217.0 mm². The positive electrode current collector plate 24 on the end surface 41 was disposed as shown in FIG. 18A, the negative electrode current collector plate 25 on the end surface 42 was disposed as shown in FIG. 18B, and S1=160.8 mm² as shown in FIG. 18C.

Comparative Example 12

Dc=Da=234.4 mm². The positive electrode current collector plate 24 on the end surface 41 was disposed as shown in FIG. 19A, the negative electrode current collector plate 25 on the end surface 42 was disposed as shown in FIG. 19B, and S1=178.1 mm² as shown in FIG. 19C.

[Evaluation]

The battery 1 of the above example was assembled and charged, a value of initial internal resistance of the battery was obtained, and a burner test was performed. The initial internal resistance and the burner test are similar to those described above. The number of tests was 100 each.

14

In Examples 11 to 15, the number of defectives in the burner test was 4 or less, which was relatively low, whereas in Comparative Examples 11 and 12, the number of defectives was 15 or more, which was relatively high. The reason for this is considered to be that in the structures of Comparative Examples 11 and 12, the areas of the positive electrode current collector plate 24 and the negative electrode current collector plate 25 are relatively large, and the generated gas hardly releases. In Example 15, the value of the internal resistance was relatively high as compared with other examples. The reason for this is considered to be that in Example 15, the area of the positive electrode current collector plate 24 is relatively small.

From Table 2, it was found that the batteries of Examples 11 to 15 had a relatively low number of defects generated in the burner test. In Examples 11 to 15, 0.20≤S1/S2≤0.44. In addition, Examples 11 to 14 had a low initial internal resistance value, and at this time, D/S2≥0.43. When the data of Examples 1 to 3 are combined therewith, the number of defects generated in the burner test is relatively low when 0≤S1/S2≤0.49, and the value of the initial internal resistance is low when D/S2≥0.43. When 0≤S1/S2≤0.49, since an overlap between the positive electrode current collector plate 24 and the negative electrode current collector plate 25 is small when viewed from the direction of the central axis of the electrode winding body 20, the battery 1 has improved gas release properties at the time of abnormal heat generation, and it can be determined that the battery 1 is a battery excellent in safety. In addition, when D/S2≥0.43, since the current collector plates 24 and 25 have a sufficient area, it can be determined that the battery 1 is a battery having low internal resistance.

The present application has been described above, and various modifications can be made according to an embodiment.

The battery size is 21700, but may be 18650 or any other size.

Although the positive electrode current collector plate 24 and the negative electrode current collector plate 25 include the plate-shaped portions 31 and 33 having a fan shape or a semicircular shape, the plate-shaped portions may have other shapes.

The present application can also be applied to other batteries other than the lithium ion battery and batteries having a shape other than a cylindrical shape (for example, a laminate-type battery, a square-type battery, a coin-type battery, and a button-type battery) without departing from the gist of the present application. In this case, the shape of

TABLE 2

| | Area Dc of positive electrode current collector plate (mm²) | Area Da of negative electrode current collector plate (mm²) | Area S1 where current collectors overlap each other (mm²) | S1/S2 | D/S2 | The number of defectives in burner test | Initial internal resistance (mΩ) |
|---|---|---|---|---|---|---|---|
| Example 11 | 217.0 | 217.0 | 138.0 | 0.44 | 0.69 | 3 | 9.82 |
| Example 12 | 180.0 | 217.0 | 106.5 | 0.34 | 0.57 | 2 | 9.73 |
| Example 13 | 180.0 | 180.0 | 69.5 | 0.22 | 0.57 | 4 | 9.90 |
| Example 14 | 136.0 | 217.0 | 62.4 | 0.20 | 0.43 | 3 | 9.92 |
| Example 15 | 127.8 | 234.4 | 71.6 | 0.23 | 0.41 | 3 | 13.89 |
| Comparative Example 11 | 234.4 | 217.0 | 160.8 | 0.51 | 0.74 | 15 | 9.81 |
| Comparative Example 12 | 234.4 | 234.4 | 178.1 | 0.57 | 0.74 | 17 | 9.82 |

US 12,651,778 B2

15 the "end surface of the electrode winding body" may be not only a cylindrical shape but also an elliptical shape, a flat shape, or the like.

Figure 20:
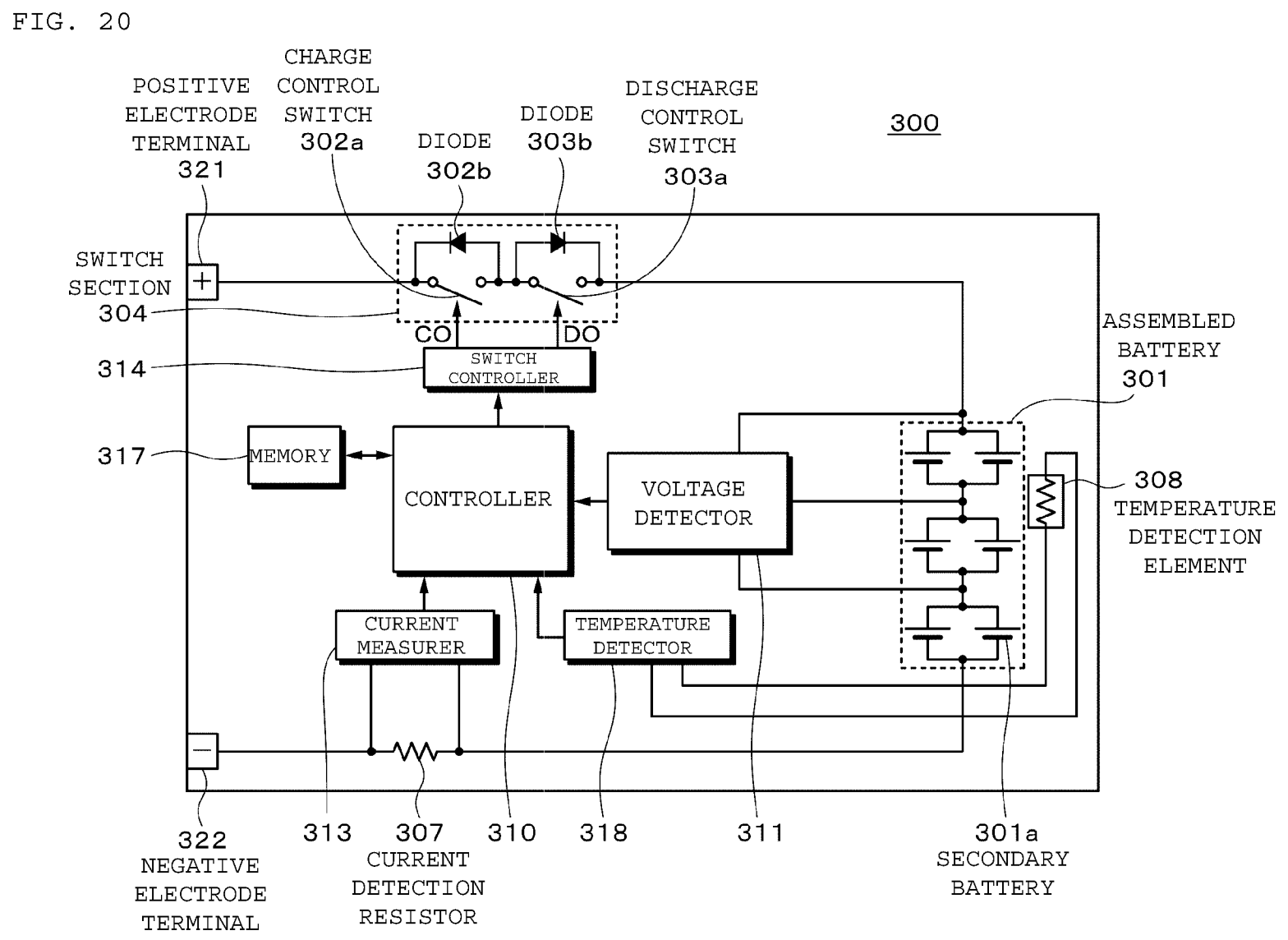

FIG. 20 is a block diagram showing a circuit configuration example in a case where the secondary battery according to an embodiment applied to a battery pack 300. The battery pack 300 includes an assembled battery 301, a switch section 304 including a charge control switch 302a and a discharge control switch 303a, a current detection resistor 307, a temperature detection element 308, and a controller 310. The controller 310 can control each device, further perform charge and discharge control at the time of abnormal heat generation, and calculate and correct a remaining capacity of the battery pack 300. A positive electrode terminal 321 and a negative electrode terminal 322 of the battery pack 300 are connected to a charger or an electronic device, and are charged and discharged.

The assembled battery 301 is formed by connecting a plurality of secondary batteries 301a to each other in series and/or in parallel. FIG. 20 shows, as an example, a case where the six secondary batteries 301a are connected to each other in 2 parallel 3 series (2P3S).

The temperature detector 318 is connected to a temperature detection element 308 (for example, a thermistor), measures the temperature of the assembled battery 301 or the battery pack 300, and supplies the measured temperature to the controller 310. A voltage detector 311 measures the voltage of the assembled battery 301 and the respective secondary batteries 301a configuring the assembled battery and performs A/D conversion of this measured voltage to supply the resulting voltage to the controller 310. A current measurer 313 measures the current by using the current detection resistor 307 and supplies this measured current to the controller 310.

A switch controller 314 controls the charge control switch 302a and the discharge control switch 303a of the switch section 304 based on the voltage and the current input from the voltage detector 311 and the current measurer 313. The switch controller 314 prevents overcharge and overdischarge by sending an OFF control signal to the switch section 304 when the voltage of the secondary battery 301a has become equal to or higher than an overcharge detection voltage (for example, 4.20 V±0.05 V) or equal to or lower than an overdischarge detection voltage (2.4 V±0.1 V).

After the charge control switch 302a or the discharge control switch 303a is turned off, charging or discharging can be performed only through a diode 302b or a diode 303b. As these charge/discharge switches, a semiconductor switch such as a MOSFET can be used. In FIG. 20, the switch section 304 is provided on a plus (+) side, but may be provided on a minus (−) side.

The memory 317 includes a RAM and a ROM, and stores and rewrites a value of the battery characteristics calculated by the controller 310, a full charge capacity, the remaining capacity, and the like.

The secondary battery according to an embodiment is mounted on a device such as an electronic device, an electric transportation device, or a power storage device, and can be used for supplying electric power.

Examples of the electronic device include notebook personal computers, smartphones, tablet terminals, PDAs (personal digital assistants), mobile phones, wearable terminals, digital still cameras, electronic books, music players, game machines, hearing aids, power tools, televisions, lighting devices, toys, medical devices, and robots. In addition, electric transportation devices, power storage devices, power tools, and electric unmanned aerial vehicles to be described later can also be included in the electronic device in a broad sense.

Examples of the electric transportation device include electric vehicles (including hybrid vehicles), electric motorcycles, electric assisted bicycles, electric buses, electric carts, automatic guided vehicles (AGV), and railway vehicles. In addition, electric passenger aircrafts and electric unmanned aircrafts for transportation are also included. The secondary battery according to an embodiment is used not only as these driving power supplies but also as an auxiliary power supply, a power supply for recovering a regenerated energy, and other power supplies.

Examples of the power storage device include power storage modules for commercial use or household use, and power supplies for electric power storage use for a building such as a house, a building, or an office, or for a power-generating facility.

Figure 21:
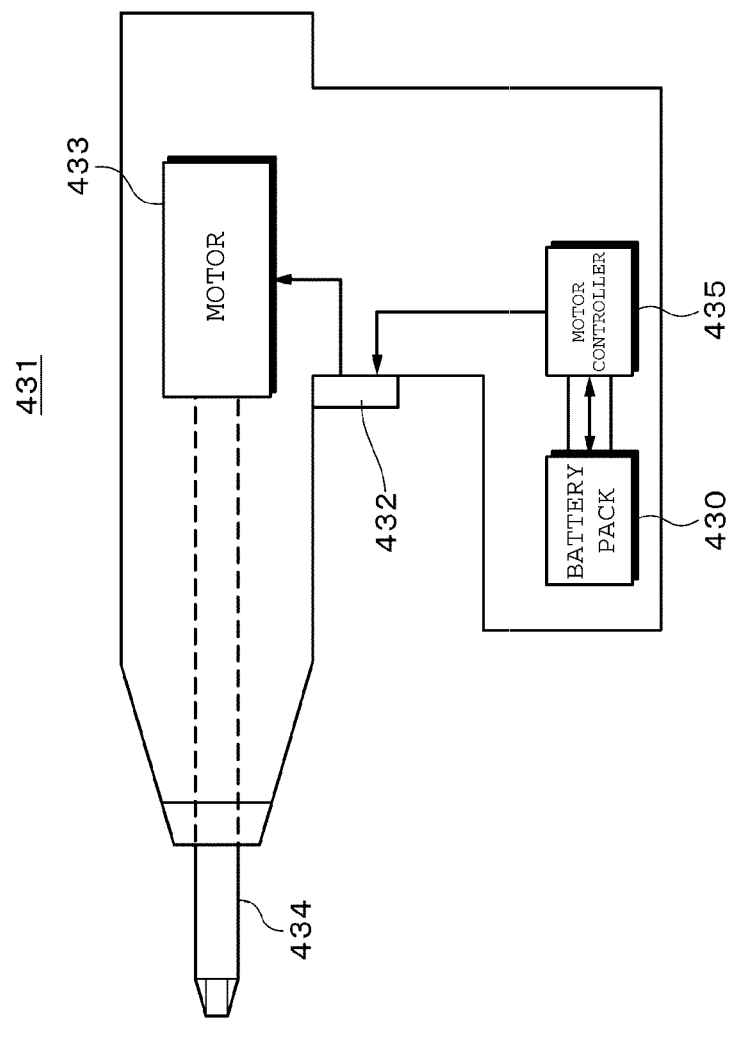
FIG. 21 is a connection diagram used for describing a power tool as an application example according to an embodiment.

An example of an electric driver as a power tool to which the present application can be applied will be schematically described with reference to FIG. 21 according to an embodiment. An electric driver 431 is provided with a motor 433 that transmits rotational power to a shaft 434 and a trigger switch 432 operated by a user. A battery pack 430 and a motor controller 435 according to an embodiment are housed in a lower housing of a handle of the electric driver 431. The battery pack 430 is built in the electric driver 431 or is detachable.

Each of the battery pack 430 and the motor controller 435 may be provided with a microcomputer (not shown) so that charge/discharge information of the battery pack 430 can be communicated with each other. The motor controller 435 can control operation of the motor 433 and cut off power supply to the motor 433 at the time of abnormality such as overdischarge.

Figure 22:
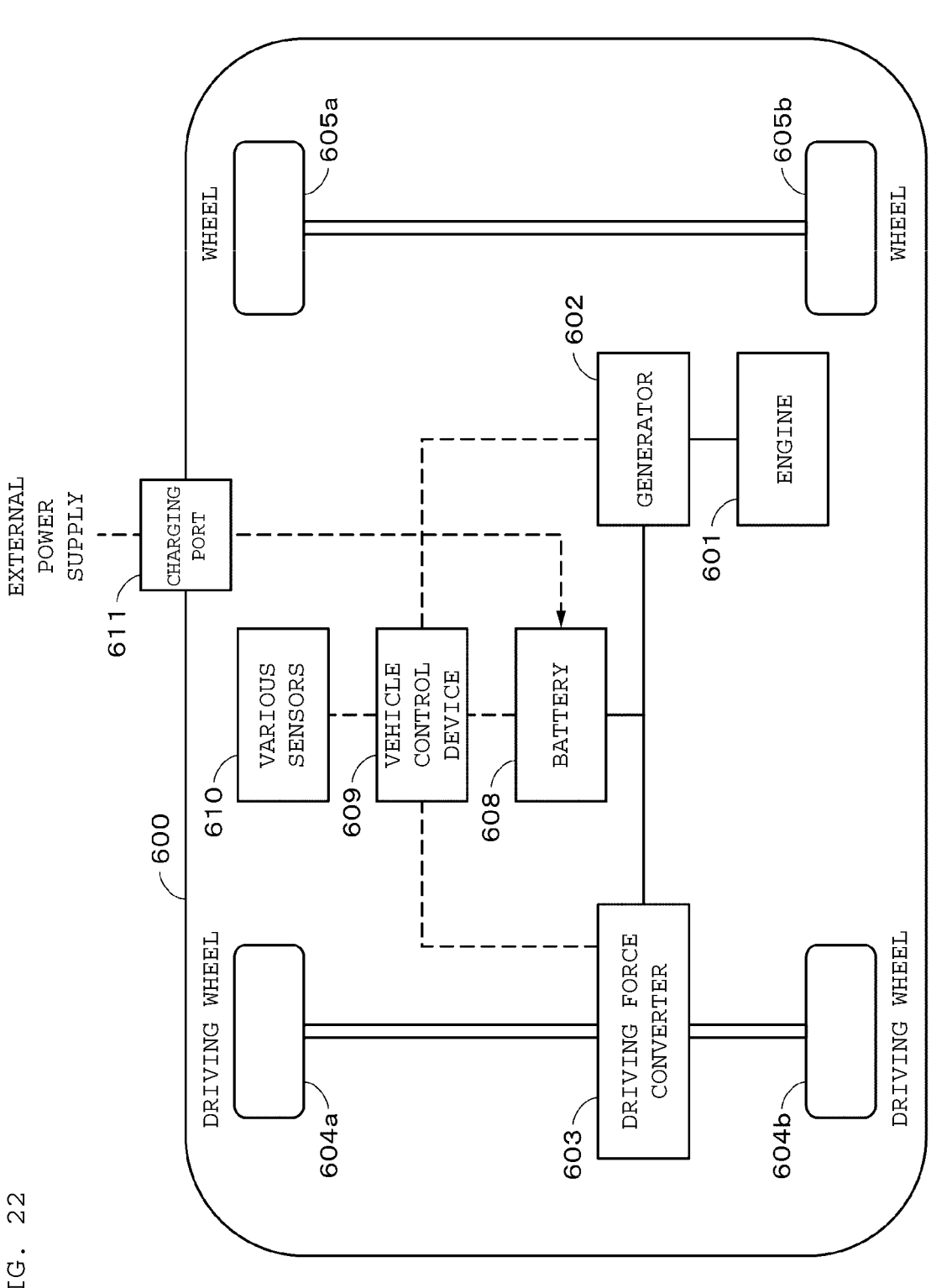
FIG. 22 is a connection diagram used for describing an electric vehicle as an application example according to an embodiment.

As an example in which the present application is applied to an electric vehicle power storage system, FIG. 22 schematically shows a configuration example of a hybrid vehicle (HV) employing a series hybrid system according to an embodiment. The series hybrid system is a car travelling with an electric power driving force converter using electric power generated by a generator powered by an engine or electric power obtained by temporarily storing the generated electric power in a battery.

An engine 601, a generator 602, an electric power driving force converter 603 (DC motor or AC motor, hereinafter, it is simply referred to as the "motor 603"), a driving wheel 604a, a driving wheel 604b, a wheel 605a, a wheel 605b, a battery 608, a vehicle control device 609, various sensors 610, and a charging port 611 are mounted in a hybrid vehicle 600 as described above. As the battery 608, the battery pack 300 or a power storage module on which a plurality of the secondary batteries are mounted can be applied according to an embodiment.

The motor 603 is operated by the electric power of the battery 608, and a rotating force of the motor 603 is transmitted to the driving wheels 604a and 604b. The electric power generated by the generator 602 can be stored in the battery 608 by the rotating force generated by the engine 601. The various sensors 610 control an engine speed through the vehicle control device 609, or control an opening degree of a throttle valve (not shown).

When the hybrid vehicle 600 is decelerated by a brake mechanism (not shown), a resistance force during the deceleration is added as a rotating force to the motor 603, and regenerative electric power generated due to this rotating force is stored in the battery 608. The battery 608 can be charged by being connected to an external power supply via the charging port 611 of the hybrid vehicle 600. Such an HV vehicle is referred to as a plug-in hybrid vehicle (PHV or PHEV).

The secondary battery according to an embodiment can also be applied to a downsized primary battery and used as a power supply of a tire pressure monitoring system (TPMS) built in wheels 604 and 605.

Although a series hybrid vehicle has been described above as an example, the present application is also applicable to a parallel system using an engine and a motor together or a hybrid vehicle in which a series system and a parallel system are combined. In addition, the present application is also applicable to an electric vehicle (EV or BEV) and a fuel cell vehicle (FCV) that travel only by a drive motor not using an engine.

DESCRIPTION OF REFERENCE SYMBOLS

1: Lithium ion battery
12: Insulating plate
21: Positive electrode
21A: Positive electrode foil
21B: Positive electrode active material layer
21C: Active material non-covered portion of positive electrode
22: Negative electrode
22A: Negative electrode foil
22B: Negative electrode active material layer
22C: Active material non-covered portion of negative electrode
23: Separator
24: Positive electrode current collector plate
25: Negative electrode current collector plate
26: Through hole
27, 28: Outer edge portion
41, 42: End surface
43: Groove It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery in which an electrode winding body having a structure in which a strip-shaped positive electrode and a strip-shaped negative electrode are stacked with a separator interposed therebetween and wound, a positive electrode current collector plate, and a negative electrode current collector plate are housed in a battery can, the positive electrode having a covered portion covered with a positive electrode active material layer and a positive electrode active material non-covered portion on a strip-shaped positive electrode foil, the negative electrode having a covered portion covered with a negative electrode active material layer and a negative electrode active material non-covered portion on a strip-shaped negative electrode foil, the positive electrode active material non-covered portion being joined to the positive electrode current collector plate at a first end portion of the electrode winding body, the negative electrode active material non-covered portion being joined to the negative electrode current collector plate at a second end portion of the electrode winding body, the electrode winding body having a first flat surface and a second flat surface formed by bending the positive electrode active material non-covered portion and the negative electrode active material non-covered portion toward a central axis of the wound structure and overlapping the positive electrode active material non-covered portion and the negative electrode active material non-covered portion, and a first groove formed in the first flat surface and a second groove formed in the second flat surface, the first end portion of the electrode winding body includes a first region that is a region not overlapping the positive electrode current collector plate, the second end portion of the electrode winding body includes a second region that is a region not overlapping the negative electrode current collector plate, as viewed in a plane, the first region and the second region do not overlap each other, and a part of the positive electrode current collector plate and a part of the negative electrode current collector plate overlap each other, and $0 < S1/S2 \leq 0.49$ being satisfied, where S1 represents an area where the part of the positive electrode current collector plate and the part of the negative electrode current collector plate overlap each other when viewed from a direction of the central axis, and S2 represents a sectional area of the electrode winding body when cut in a direction perpendicular to the central axis.

2. The secondary battery according to claim 1, wherein $D/S2 \geq 0.43$ is satisfied, where D is a smaller value of Dc and Da, Dc is an area where a plate-shaped portion of the positive electrode current collector plate covers the positive electrode active material non-covered portion at one end portion of the electrode winding body, Da is an area where a plate-shaped portion of the negative electrode current collector plate covers the negative electrode active material non-covered portion at the other end portion of the electrode winding body.

3. An electronic device comprising the secondary battery according to claim 1.

4. A power tool comprising the secondary battery according to claim 1.

5. The secondary battery according to claim 1, wherein as viewed in a plane, a region occupied by the electrode winding body overlaps at least part of a region occupied by the positive electrode current collector plate, at least part of a region occupied by the negative electrode current collector plate, or both.

6. The secondary battery according to claim 1, wherein the positive electrode current collector plate and the negative electrode current collector plate each include a plate-shaped portion having a flat fan shape, the plate-shaped portion of the positive electrode current collector plate covers a part of the first end portion of the electrode winding body, and the plate-shaped portion of the negative electrode current collector plate covers a part of the second end portion of the electrode winding body.

7. The secondary battery according to claim 1, wherein as viewed in a plane, an overlapping region in which the positive electrode current collector plate and the negative electrode current collector plate overlap each other surrounds a part of a through hole of the electrode winding body.

8. A secondary battery in which an electrode winding body having a structure in which a strip-shaped positive electrode and a strip-shaped negative electrode are stacked with a separator interposed therebetween and wound, a positive electrode current collector plate, and a negative electrode current collector plate are housed in a battery can, the positive electrode having a covered portion covered with a positive electrode active material layer and a positive electrode active material non-covered portion on a strip-shaped positive electrode foil, the negative electrode having a covered portion covered with a negative electrode active material layer and a negative electrode active material non-covered portion on a strip-shaped negative electrode foil, the positive electrode active material non-covered portion being joined to the positive electrode current collector plate at a first end portion of the electrode winding body, the negative electrode active material non-covered portion being joined to the negative electrode current collector plate at a second end portion of the electrode winding body, the electrode winding body having a first flat surface and a second flat surface formed by bending the positive electrode active material non-covered portion and the negative electrode active material non-covered portion toward a central axis of the wound structure and overlapping the positive electrode active material non-covered portion and the negative electrode active material non-covered portion, and a first groove formed in the first flat surface and a second groove formed in the second flat surface, the first end portion of the electrode winding body includes a first region that is a region not overlapping the positive electrode current collector plate, the second end portion of the electrode winding body includes a second region that is a region not overlapping the negative electrode current collector plate, as viewed in a plane, the first region and the second region do not overlap each other, and the positive electrode current collector plate and the negative electrode current collector plate are present in respective locations not overlapping each other, and $0 = S1/S2$ being satisfied, where S1 represents an area where the part of the positive electrode current collector plate and the part of the negative electrode current collector plate overlap each other when viewed from a direction of the central axis, and S2 represents a sectional area of the electrode winding body when cut in a direction perpendicular to the central axis.

9. The secondary battery according to claim 8, wherein $D/S2 \geq 0.43$ is satisfied, where D is a smaller value of Dc and Da, Dc is an area where a plate-shaped portion of the positive electrode current collector plate covers the positive electrode active material non-covered portion at one end portion of the electrode winding body, Da is an area where a plate-shaped portion of the negative electrode current collector plate covers the negative electrode active material non-covered portion at the other end portion of the electrode winding body.

10. An electronic device comprising the secondary battery according to claim 8.

11. A power tool comprising the secondary battery according to claim 8.

\* \* \* \* \*